United States Patent [19]
Svarz

[11] 3,846,495
[45] Nov. 5, 1974

[54] CONVERSION OF NITRILE TO ITS CORRESPONDING AMIDE USING IMPROVED COPPER OXIDE CATALYST

[75] Inventor: Jerry J. Svarz, La Grange, Ill.

[73] Assignee: Nalco Chemical Company, Chicago, Ill.

[22] Filed: Sept. 25, 1972

[21] Appl. No.: 292,216

[52] U.S. Cl. ...... 260/561 N, 260/557 R, 260/559 R, 260/561 A
[51] Int. Cl. .......................................... C07c 103/08
[58] Field of Search .......................... 260/557–561; 423/600, 604, 593; 252/463

[56] References Cited
UNITED STATES PATENTS
3,642,894   2/1972   Habermann et al. .............. 260/561

Primary Examiner—Harry I. Moatz
Attorney, Agent, or Firm—John G. Premo; James F. Lambe

[57] ABSTRACT

A process for catalytically hydrolyzing a nitrile to the corresponding amide by contacting the nitrile in the presence of water with an activated copper oxide.

4 Claims, No Drawings

CONVERSION OF NITRILE TO ITS CORRESPONDING AMIDE USING IMPROVED COPPER OXIDE CATALYST

This invention relates to a process for catalytically hydrolyzing a nitrile to the corresponding amide. The hydrolysis nitriles form the corresponding amides and other hydrolysis products in the presence of acids and bases are well known to those skilled in the art as noted in U.S. Pat. No. 3,381,034. The prior art teaches the use of copper-copper ion catalysts, reduced copper oxide catalysts, reduced copper chromium or copper-aluminum oxide catalysts and other catalysts composed of heavy metal such as zinc, cadmium, chromium and silver. These catalysts as well as others are disclosed in U.S. Pat. No. 3,381,034; 3,631,104; 3,642,894; 3,597,481 and 3,642,643. However, it has been determined that copper oxide, per se, does not work efficiently as a catalyst in the conversion of a nitrile to its corresponding amide. In all cases a "reduced" copper oxide catalyst is mentioned and used in the prior art.

The present invention involves the activation of copper oxide to provide a catalyst useful in hydrolyzing a nitrile to its corresponding amide. It has been discovered that by contacting the copper oxide with a dilute aqueous solution of an alkali metal hydroxide and powdered aluminum followed by filtering, washing and recovering the copper oxide, an activated catalyst is formed. The discovery of this improved method of preparing a copper oxide catalyst has resulted in a substantial increase in conversion of nitrile to amide.

OBJECTS

It is therefore an object of this invention to provide an improved catalyst for hydrolyzing nitrile to the corresponding amide.

It is also an object of this invention to provide a process for hydrolyzing the nitrile to the corresponding amide, the improvement which comprises the reaction of nitrile in the presence of an improved catalyst composition.

It is a further object of this invention to provide a process for hydrolyzing acrylonitrile to acrylamide.

A still further object of this invention is to provide a process for hydrolyzing acrylonitrile to acrylamide, the improvement comprises the reaction of acrylonitrile in the presence of an activated copper oxide catalyst.

Further objects will appear hereinafter.

INVENTION

This invention involves a process for catalytically hydrolyzing a nitrile to its corresponding amide using activated copper oxide as a catalyst. Basically, the preparation of the activated copper oxide catalyst involves the following steps:

A. Contacting an aqueous slurry of copper oxide for ½ to 3 hours with a dilute aqueous solution of an alkali metal hydroxide to yield a slurry containing 1 to 75 percent by weight of copper oxide and 1.0 to 90 percent by weight based on the copper oxide of powdered aluminum to form an activated copper oxide catalyst; and B. Filtering, washing and recovering the copper oxide catalyst.

The first step of the activation of copper oxide involves the contacting of copper oxide with a solution of alkali metal hydroxide and aluminum as described in step (A) above. Copper oxide is added to a dilute aqueous solution of an alkali metal hydroxide. The Term copper oxide refers to and includes both cuprous oxide and cupric oxide. Generally, the dilute aqueous solution of the alkali metal hydroxide is present in the range of 10 to 100 percent by weight based on copper oxide with the preferred range being 5 to 50 percent by weight. The concentration of the caustic solution may vary over a wide range. In general, the concentration of the caustic solution is from 5 to 20 percent by weight. The preferred alkali metal hydroxides are sodium hydroxide and potassium hydroxide. Typically, it is desired to prepare a slurry which has from 1 to 75 percent by weight of copper oxide.

In addition to the alkali metal hydroxide being added to the copper oxide, from 1.0 to 90 percent by weight based on the copper oxide of powdered aluminum is added to the mixture. The preferred concentration of aluminum added is 10 to 50 percent by weight. The powdered aluminum may be added simultaneously or sequentially with the copper oxide. This total mixture is agitated for ½ to 3 hours at ambient temperature. The reaction may be performed with the temperature in the range of 0° to 90°C. Preferably the temperature is within the range of 20° to 30°C.

It has been determined that zinc and tin may be substituted for aluminum in the practice of this invention. However, it should be pointed out that the use of zinc or tin does not provide as active of a catalyst as does the use of aluminum. The conversion of nitrile to amide may be reduced by as much as 50 percent.

After the reaction has been completed the supernatant liquid is decanted from the activated copper oxide and the solid catalyst is isolated and water washed. Generally, the solid catalyst is water washed with seven aliquots of water with each aliquot having an equivalent weight to that of the catalyst. Once the catalyst has been filtered and water washed it is recovered ant the activated copper oxide catalyst is then ready for use in the hydrolysis of a nitrile to form an amide.

The nitriles which may be hydrolyzed by the catalysts prepared by the present invention may be aliphatic or aromatic nitriles with those nitriles containing up to 20 or more carbon atoms being preferred. For purposes of the invention, aromatic nitriles are defined as those nitriles having cyano groups attached to the aromatic nucleus. Representative examples of suitable nitriles include saturated aliphatic hydrocarbon nitriles such as acetonitrile, propionitrile, pentanonitrile, dodecanonitrile, succinonitrile, adiponitrile, and the like; unsaturated aliphatic hydrocarbon nitriles such as acrylonitrile, methacrylonitrile, crotonic nitrile, β-phenylacrylonitrile, 2-cyano-2-butene, 1-cyano-1-octene, 10-indecenonitrile, maleonitrile, fumaronitrile, and the like; aromatic nitriles such as benzonitrile, p-toluonitrile, α-naphthonitrile, phthalonitrile and the like. Of the nitriles suitable for use in the invention, olefinic nitriles of three to six carbon atoms are especially preferred with the conversion of acrylonitrile to acrylamide being of special interest.

The hydrolysis of the nitrile to the corresponding amide in the invention may be conducted in an essentially aqueous media. Excess water is the preferred solvent although other inert solvents such as dioxane, dimethylsulfoxide, acetone, dimethyl ether of ethylene glycol or tetrahydrofuran, may be used. Any practical amount of water may be added. Molar excesses of water up to 50 mole of water to 1 mole of nitrile are suitable with excesses of less than 40:1 being preferred. In the practice of this invention, the nitrile may be added to the aqueous mix containing the Raney copper catalyst.

The temperature at which the nitriles are converted to the amides is basically a function of the reactants used in the process of the invention. Since the reaction of the present invention is a liquid phase hydrolysis, the melting and boiling points of the reaction mixture are the limiting factors of the range of reaction temperatures. As a practical matter, the suitable range of temperatures is from 0° to 400°C. with 25° to 200°C. being preferred. For unsaturated nitriles which tend to polymerize, a reaction temperature of less than 200°C. is desirable.

The following examples further illustrate the discovery of this invention:

EXAMPLE 1

A 100 gram sample of cupric oxide, 250 grams of a 50 percent sodium hydroxide solution, 35 grams of powdered aluminum and 5.0 cc of N-butanol were added to a beaker with mixing. The temperature was maintained within the range of 25° to 30°C. for 30 minutes. The aluminum powder was slowly added over a period of 40 to 45 minutes while maintaining the temperature within the above specified range. The contents were agitated for 40 minutes after the aluminum powder addition. At this time the copper oxide catalyst was isolated and washed with 500 ml of water. The final pH of the oxide slurry was 7.8.

EXAMPLE 2

The following ingredients were used in this reaction:

50 grams of CuO
250 grams of 50 percent sodium hydroxide solution
370 cc of water
5 cc of N-butanol The sodium hydroxide solution, water, cuprous oxide and N-butanol were added to a beaker with mixing. The powdered aluminum was added over a one hour period holding the temperature within the range of 25° to 30°C. After the one hour addition of powdered aluminum, the mixture was agitated for an additional 1½ hours and then diluted with 350 cc of water. The oxide catalyst was isolated and water washed with nine separate aliquots of 75 cc water each. The final pH of the oxide slurry was 8.2.

EXAMPLE 3

Added to an autoclave with the following reactants were:
14.4 grams of filtered wet copper catalyst
148.0 grams of water
52.0 grams of acrylonitrile These reactants were added with mixing to an autoclave which was heated to 105°C. After 2 and 4 hours the conversion of nitrile to amide was measured for each of the copper oxide catalysts as shown below in TABLE I.

TABLE I

| Type | % Conversion | | |
|---|---|---|---|
| | 2 Hr. | 4 Hr. | 6 Hr. |
| $Cu_2O$ | — | — | 2.82 |
| CuO | — | — | 4.20 |
| Activated $Cu_2O$ (Ex 1) | 62.4 | 79.2 | — |
| Activated CuO (Ex 2) | 44.8 | 55.0 | — |

Similar results to those obtained in the above examples were obtained from the following nitriles tested: methacrylonitrile, acetonitrile, maleonitrile, benzonitrile and crotonic nitrile.

CONCLUSION

The previous examples clearly show that copper oxide can be activated by treatment with an alkali metal hydroxide with powdered aluminum. The increase in the conversion rate of a nitrile to its corresponding amide is substantially improved by the use of the catalysts of this invention. In comparing the cuprous oxide the conversion was increased from 2.85 percent to 62.4 and 79.2 percent for 2 and 4 hour conversions at 105°C., respectively. For the cupric oxide, the conversion rate was increased from 4.2 percent to 44.8 and 55.0 percent for 2 and 4 hour conversions at 105°C., respectively. Thus, there was a dramatic increase in the conversion of nitrile to amide in the activation of copper oxide using the procedure taught in this invention.

I claim:

1. A process for catalytically hydrolyzing acrylonitrile to acrylamide, the improvement comprising contacting a reactant feed of acrylonitrile in the presence of water in a liquid phase with an activated copper oxide prepared by the following steps:
   A. contacting an aqueous slurry of copper oxide and powdered alumina for ½ to 3 hours at a temperature within the range 0°–90°C with a dilute aqueous solution of from 5–20 percent by weight of an alkali metal hydroxide to yield a slurry containing 1 to 75 percent by weight of copper oxide and 1.0 to 90 percent by weight based on said copper oxide of powdered aluminum to form an activated copper oxide oxide catalyst; and
   B. filtering, washing and recovering said copper oxide catalyst.

2. A method of claim 1 wherein the alkali metal hydroxide is selected from the group consisting of sodium hydroxide and potassium hydroxide.

3. A method of claim 1 wherein the concentration of powdered aluminum is 10 to 50 percent by weight of copper oxide.

4. A method of claim 1 wherein the activation is performed within the temperature range 20° to 30°C.

* * * * *

UNITED STATES PATENT OFFICE
CERTIFICATE OF CORRECTION

Patent No. 3,846,495     Dated November 5, 1974

Inventor(s) Jerry J. Svarz

It is certified that error appears in the above-identified patent and that said Letters Patent are hereby corrected as shown below:

Column 4, line 42 for "alumina", read --aluminum--.

Signed and sealed this 7th day of January 1975.

(SEAL)
Attest:

McCOY M. GIBSON JR.
Attesting Officer

C. MARSHALL DANN
Commissioner of Patents